(12) United States Patent
Ryan et al.

(10) Patent No.: US 12,719,044 B2
(45) Date of Patent: Aug. 25, 2026

(54) METHOD OF, AND APPARATUS FOR, MANUFACTURING ALKALI METAL COATED CURRENT COLLECTORS FOR BATTERIES

(71) Applicant: GM GLOBAL TECHNOLOGY OPERATIONS LLC, Detroit, MI (US)

(72) Inventors: Daniel Ryan, Fenton, MI (US); Nicole Ellison, Southfield, MI (US); Shaomao Xu, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 127 days.

(21) Appl. No.: 18/497,358

(22) Filed: Oct. 30, 2023

(65) Prior Publication Data

US 2025/0140776 A1 May 1, 2025

(51) Int. Cl.
*C23C 26/02* (2006.01)
*B05C 5/02* (2006.01)
(Continued)

(52) U.S. Cl.
CPC ......... *H01M 4/0404* (2013.01); *B05C 5/0241* (2013.01); *B05C 9/04* (2013.01);
(Continued)

(58) Field of Classification Search
CPC ..... C23C 26/02; H01M 4/382; H01M 4/0411; Y02E 60/10
See application file for complete search history.

(56) References Cited

U.S. PATENT DOCUMENTS 4,824,746 A * 4/1989 Belanger ............. H01M 4/0402 429/231.95
6,547,995 B1 * 4/2003 Comb ..................... B29C 48/92 264/308

(Continued)

FOREIGN PATENT DOCUMENTS

DE 10160949 A1 * 6/2003 ........... C23C 2/0062

OTHER PUBLICATIONS

DE-10160949-A1 English translation (Year: 2001).*
Office Action dated Jun. 24, 2024 from German Patent Office for German Patent No. 10 2024 101 488.1; 4pgs.

*Primary Examiner* — Hai Y Zhang

(57) ABSTRACT

A method of manufacturing an alkali metal coated current collector for a battery, the method includes melting the alkali metal, removing impurities floating on the surface of the melted alkali metal; applying the purified melted alkali metal to the surface of at least one side of a passing current collector substrate to form a coating on the current collector substrate. A system for manufacturing an alkali metal coated current collector for a battery includes at least one extruder having a melt chamber, an inlet extending to the melt chamber, at least one feed roller in the inlet for feeding alkali metal introduced into the inlet to the melt chamber; a heater for melting alkali metal in the melt chamber; an opening in the chamber for removing impurities floating on the melted alkali metal in the melt chamber; an outlet extending from the melt chamber to a dispensing opening; a reservoir for receiving melted alkali metal; and at least one drive roller for driving a current collector substrate past the reservoir to receive a coating of melted alkali metal.

10 Claims, 6 Drawing Sheets

(51) Int. Cl.
*B05C 9/04* (2006.01)
*B05C 11/11* (2006.01)
*B05C 13/00* (2006.01)
*B22D 1/00* (2006.01)
*B22D 19/00* (2006.01)
*H01M 4/04* (2006.01)
*H01M 4/38* (2006.01)

(52) U.S. Cl.
CPC .............. *B05C 11/11* (2013.01); *B05C 13/00* (2013.01); *B22D 1/00* (2013.01); *B22D 19/00* (2013.01); *C23C 26/02* (2013.01); *H01M 4/382* (2013.01)

(56) References Cited

U.S. PATENT DOCUMENTS

2015/0140225 A1* 5/2015 Gusek ..................... C23C 2/325
427/432
2019/0190000 A1* 6/2019 Herle ..................... H01G 11/84
2020/0384556 A1* 12/2020 Sohn ...................... B23K 10/00

* cited by examiner

METHOD OF, AND APPARATUS FOR, MANUFACTURING ALKALI METAL COATED CURRENT COLLECTORS FOR BATTERIES

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to methods of, and apparatus for, manufacturing alkali metal coated current collectors, such as those used in batteries.

Present methods of and apparatus for manufacturing alkali metal coated current collectors have a number of disadvantages, including complexity and the amount of space required for performing such methods, and employing such apparatuses.

SUMMARY

Embodiments of the methods and apparatuses of this disclosure provide streamlined processes and simplified and more compact apparatuses for the production of alkali metal coated current collectors, such as those used in batteries.

According to a first embodiment of this disclosure a method of manufacturing an alkali metal coated current collector is provided. In accordance with this first embodiment, alkali metal is first melted in an inert atmosphere, and impurities floating on the surface of the melted metal are removed. The purified metal is then applied directly to the surface of at least one side of a current collector substrate, and optionally both sides of current collector substrate. These current collector substrates are typically a thin foil or web of stainless steel, copper, aluminum titanium, carbon fiber, or other suitable material. In some embodiments the alkali metal is applied as the current collector substrate moves vertically.

According to a second embodiment of this disclosure, an apparatus for manufacturing an alkali metal coated current collector is provided. This apparatus can comprise one or more extruders, each having a melt chamber, an inlet extending to the melt chamber, at least one feed roller in the inlet for feeding alkali metal introduced into the inlet to the melt chamber; and a heater for melting alkali metal in the melt chamber. The feed rollers can be adjustable, such as by spring tension, magnetism, electromagnetism, or air pressure, to provide the appropriate contact force to the alkali metal being added to the melt chamber. There can be an opening in each melt chamber for removing impurities floating on the melted alkali metal in the melt chamber. There is also an outlet extending from the melt chamber to deliver melted alkali metal to a dispensing opening; and then to a dispensing chamber.

At least one drive roller drives a current collector substrate vertically though the dispensing chamber, where alkali metal is applied to both faces of the current collector substrate. The apparatus can include a temperature-controlled zone to condition the coated substrate. After the temperature-controlled zone, optional post extrusion controlled wipers with tips can further condition the surface of the alkali metal on the current collector substrate. A pair of conditioning rollers can further treat the surface, and help drive the substrate through the dispensing chamber.

According to a third embodiment of this disclosure, an apparatus for manufacturing an alkali metal coated current collector is provided. This apparatus can comprise one or more extruders, each having a melt chamber in the form of a passageway, an inlet extending to the melt chamber, at least one feed roller in the inlet for feeding alkali metal introduced into the inlet to the melt chamber; and a heater for melting alkali metal in the melt chamber. There is also an outlet extending from the melt chamber to deliver melted alkali metal through an outlet opening to a manifold containing a dispensing chamber.

At least one drive roller drives a current collector substrate vertically though the dispensing chamber, where alkali metal is applied to both faces of the current collector substrate. The apparatus can include a temperature-controlled zone to condition the coated substrate. After the temperature-controlled zone, optional post extrusion controlled wipers with tips can further condition the surface of the alkali metal on the current collector substrate. A pair of conditioning rollers can further treat the surface, and help drive the substrate through the dispensing chamber.

According to a fourth embodiment of this disclosure, an apparatus for manufacturing an alkali metal coated current collector is provided. This apparatus can comprise one or more extruders, each having a melt chamber in the form of a passageway, an inlet extending to the melt chamber, at least one feed roller in the inlet for feeding alkali metal introduced into the inlet to the melt chamber; and a heater for melting alkali metal in the melt chamber. There is also an outlet extending from the melt chamber to deliver melted alkali metal through an outlet opening to a reservoir and then to a dispensing chamber communicating with the reservoir. Recirculation conduits recirculate melted metal from the dispensing chamber back to the reservoir.

At least one drive roller drives a current collector substrate vertically though the reservoir and the dispensing chamber, where alkali metal is applied to both faces of the current collector substrate. The apparatus can include a temperature-controlled zone to condition the coated substrate. After the temperature-controlled zone, optional post extrusion controlled wipers with tips can further condition the surface of the alkali metal on the current collector substrate. A pair of conditioning rollers can further treat the surface, and help drive the substrate through the dispensing chamber.

According to a fifth embodiment of this disclosure, an apparatus for manufacturing an alkali metal coated current collector is provided. This apparatus can comprise an extruder, having a melt chamber in the form of a passageway, an inlet extending to the melt chamber, at least one feed roller in the inlet for feeding alkali metal introduced into the inlet to the melt chamber; and a heater for melting alkali metal in the melt chamber. There is also an outlet extending from the melt chamber to deliver melted alkali metal through an outlet opening to a dispensing chamber formed between two rollers.

At least one drive roller drives a current collector substrate past the dispensing chamber, where alkali metal is applied to the face of the current collector substrate. The opposite side of the current collector substrate can be supported on a stage, which optionally can be ultrasonically driven to distribute the metal applied to the current collector substrate. The apparatus can include a temperature-controlled zone to condition the coated substrate. After the temperature-controlled zone, optional post extrusion controlled wipers which can further condition the surface of the alkali metal. A pair of conditioning rollers can further treat the surface, and help drive the substrate past the dispensing chamber.

According to a sixth embodiment of this disclosure, an apparatus for manufacturing an alkali metal coated current collector is provided. This apparatus can comprise one or more extruders, each having a melt chamber in the form of a passageway, an inlet extending to the melt chamber, at least one feed roller in the inlet for feeding alkali metal introduced into the inlet to the melt chamber; and a heater for melting alkali metal in the melt chamber. There is also an outlet extending from the melt chamber to deliver melted alkali metal through a dispensing opening to a reservoir. The reservoir has a bypass through which impurities floating on the surface of the melted alkali metal can be separated from the melted alkali metal. The reservoir empties via an outlet to a dispensing chamber formed between dispensing rollers. At least one drive roller drives a current collector substrate past the dispensing chamber, where alkali metal is applied to a face of the current collector substrate. The apparatus can include a temperature-controlled zone to condition the coated substrate. After the temperature-controlled zone, optional post extrusion-controlled wipers with tips can further condition the surface of the alkali metal. A pair of conditioning rollers can further treat the surface, and help drive the substrate past the dispensing chamber.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
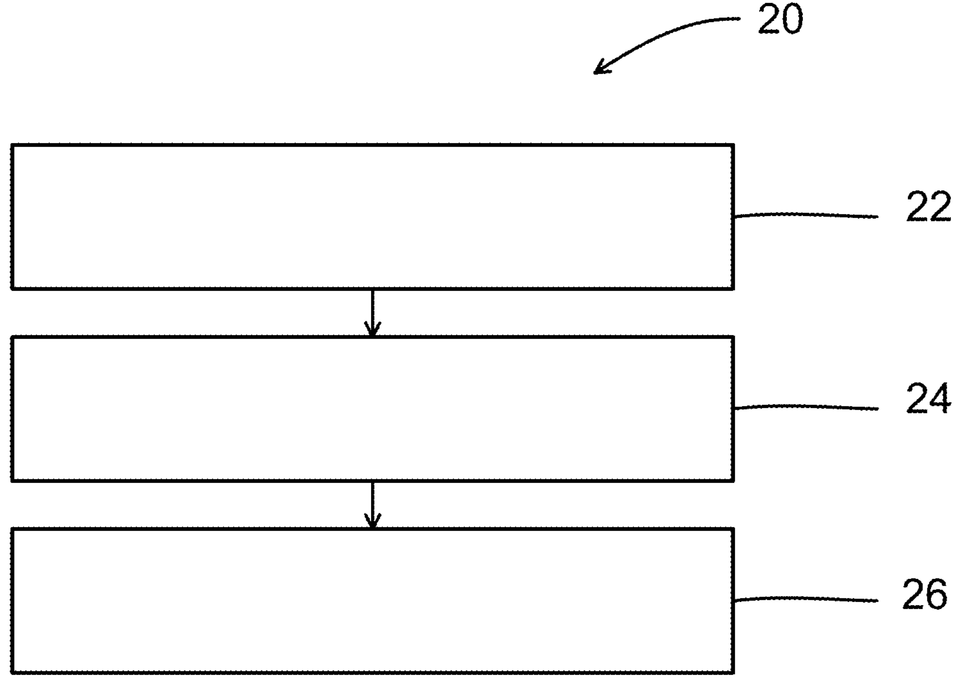
FIG. 1 is a flow chart of a method of manufacturing an alkali metal coated current collector according to a first embodiment of this disclosure.

A method of manufacturing an alkali metal coated current collector according to a first embodiment of this disclosure is indicated generally as 20 in FIG. 1. This alkali metal can be any of the alkali metals (lithium, sodium, potassium, rubidium, and cesium), and in particular lithium which is widely used in batteries. In accordance with this first embodiment, at 22 alkali metal is first melted in an inert atmosphere, and at 24 impurities floating on the surface of the melted alkali metal are removed. At 26, the purified metal is then applied directly to the surface of at least one side of a current collector substrate, and optionally to both sides of the current collector substrate. The alkali metal can be between 1 μm to about 100 μm thick. In some embodiments the alkali metal is applied as the current collector substrate moves vertically, and is applied on both sides of the collector substrate.

Figure 2:
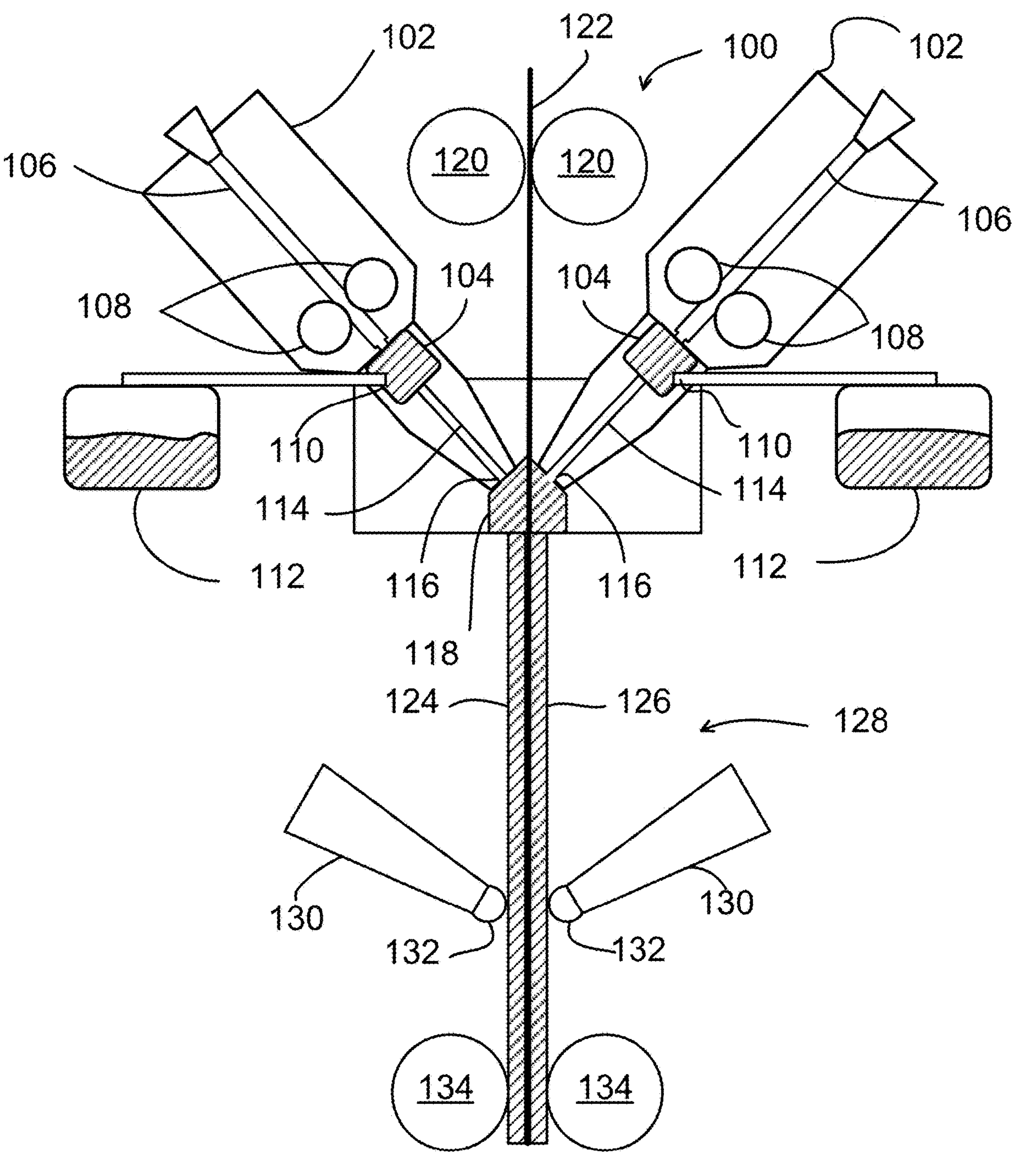
FIG. 2 is a schematic diagram of an apparatus for manufacturing an alkali metal coated current collector according to a second embodiment of this disclosure.

An apparatus for manufacturing an alkali metal coated current collector according to a second embodiment of this disclosure is indicated generally as 100 in FIG. 2. This apparatus 100 can comprise one or more extruders 102, each having a melt chamber 104 in the form of a cavity inside the extruder, and an inlet 106 extending to the melt chamber. There can be at least one feed roller 108 in the inlet 106 for feeding alkali metal introduced into the inlet to the melt chamber. The inlet 106 and feed rollers 108 can feed alkali metal in the form of plates or coupons, or rolled stock. The extruders 102 can include a heater, such as an induction heater, for melting alkali metal in the melt chamber 104.

The speed of operation of the rollers 108 and the operation of the heater can be coordinated so that the alkali metal is delivered at the correct temperature and quantity for coating the current collector substrate. In addition, the heater may include a thermostatic control. Further, the feed rollers can be adjustable, such as by spring tension, magnetism, electromagnetism, or air pressure, to provide the appropriate contact force to the alkali metal being added to the melt chamber, and ensure that the supply of material is not hindered or otherwise restricted.

There can be an opening 110 in the melt chamber 104 for removing impurities floating on the melted alkali metal in the melt chamber. The impurities, such as metal oxides and foreign matter, can be collected in receptacles 112. There is also an outlet 114 extending from the melt chamber 104 to deliver the melted alkali metal to a dispensing opening 116 to a dispensing chamber 118. The dispensing chamber 118 may also have a heater, such as an induction heater, optionally thermostatically controlled, to maintain the temperature of the melted alkali metal in a suitable temperature range for application to current collector substrate.

At least one drive roller 120 drives a current collector substrate 122 vertically though the dispensing chamber 118, where alkali metal layers 124, 126 are applied to both faces of the current collector substrate. The apparatus 120 can include a temperature controlled zone 128 to condition the coated substrate. After the temperature controlled zone 128, optional post extrusion controlled wipers 130 with tips 132 can further condition the surface of the alkali metal, on the current collector substrate. A pair of conditioning rollers 134 can further treat the surface, and help drive the substrate through the dispensing chamber.

Figure 3:
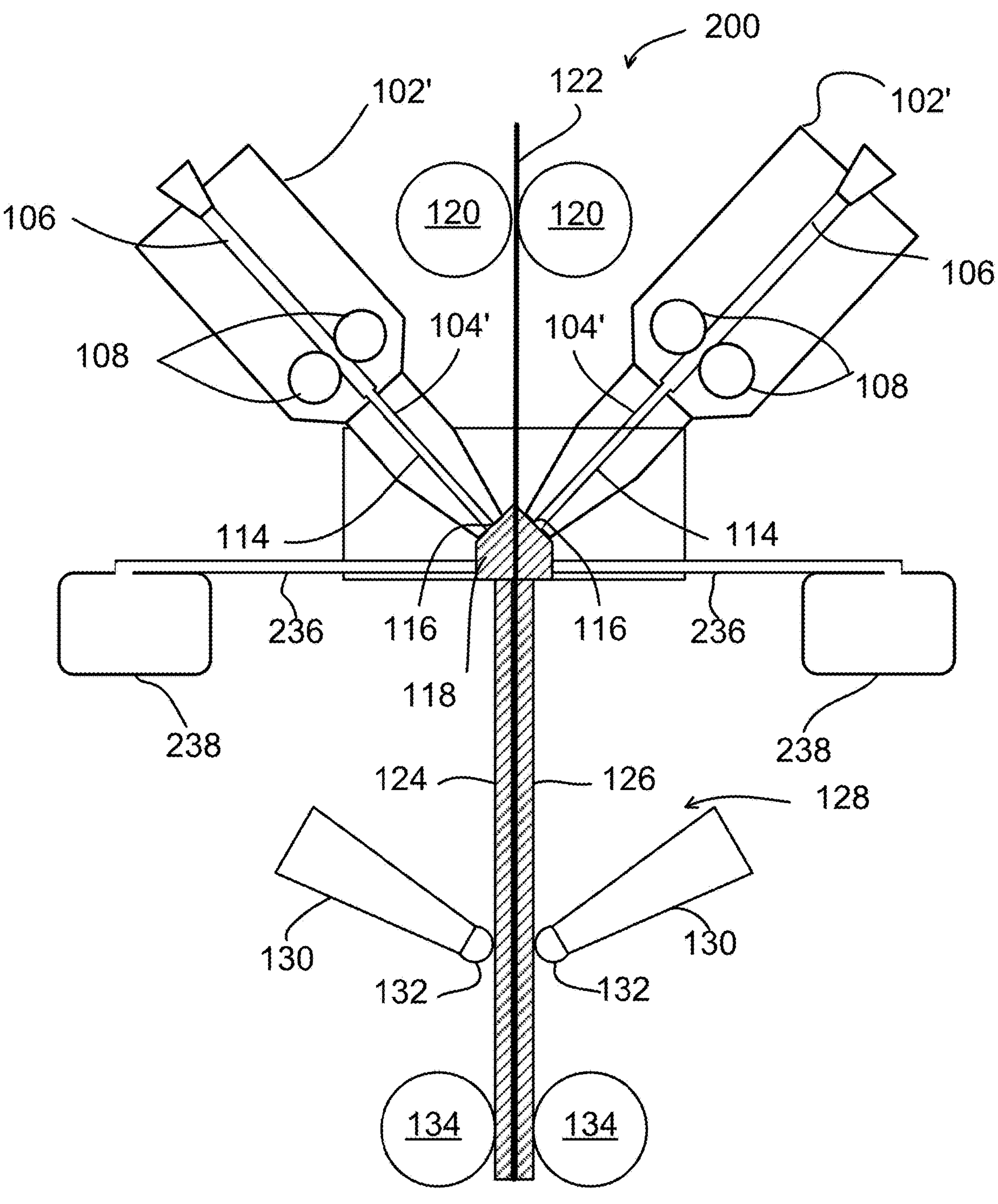
FIG. 3 is a schematic diagram of an apparatus for manufacturing an alkali metal coated current collector according to a third embodiment of this disclosure.

An apparatus for manufacturing an alkali metal coated current collector according to a third embodiment of this disclosure, is indicated generally as 200 in FIG. 3. The apparatus 200 is similar to the apparatus 100, and corresponding parts are identified with corresponding reference numerals. The apparatus 200 can comprise one or more extruders 102', each having a melt chamber 104' in the form of a passageway inside the extruder. There can be at an inlet 106 extending to the melt chamber 104'. There can be at least one feed roller 108 in the inlet 106 for feeding alkali metal introduced into the inlet to the melt chamber. The inlet 106 and feed rollers 108 can feed alkali metal in the form of plates or coupons, or rolled stock. The extruders 102' can include a heater, such as an induction heater for melting alkali metal in the melt chamber 104'.

The speed of operation of the rollers 108 and the operation of the heater can be coordinated to so that the alkali metal is delivered at the correct temperature and quantity for coating the current collector substrate. In addition the heater may include a thermostatic control.

There is an outlet 114 extending from the melt chamber 104' to deliver to melted alkali metal to a dispensing opening 116 to a dispensing chamber 118. The dispensing chamber 118 may also have a heater, such as an induction heater, optionally thermostatically controlled, to maintain the temperature of the melted alkali metal in a suitable temperature range for application to current collector substrate. Temperatures sensors can be provided at the dispensing opening 116 and in the dispensing chamber 118.

There can be an opening 236 in the dispensing chamber 118 for removing excess lithium to a collection chamber 238, and maintain the liquid casting pressure in the dispensing chamber.

At least one drive roller 120 drives a current collector substrate 122 vertically though the dispensing chamber 118, where alkali metal layers 124, 126 are applied to both faces of the current collector substrate. The apparatus 120 can include a temperature controlled zone 128 to condition the coated substrate. After the temperature controlled zone 128, optional post extrusion controlled wipers 130 with tips 132 can further condition the surface of the alkali metal on the current collector substrate. A pair of conditioning rollers 134 can further treat the surface, and help drive the substrate through the dispensing chamber.

Figure 4:
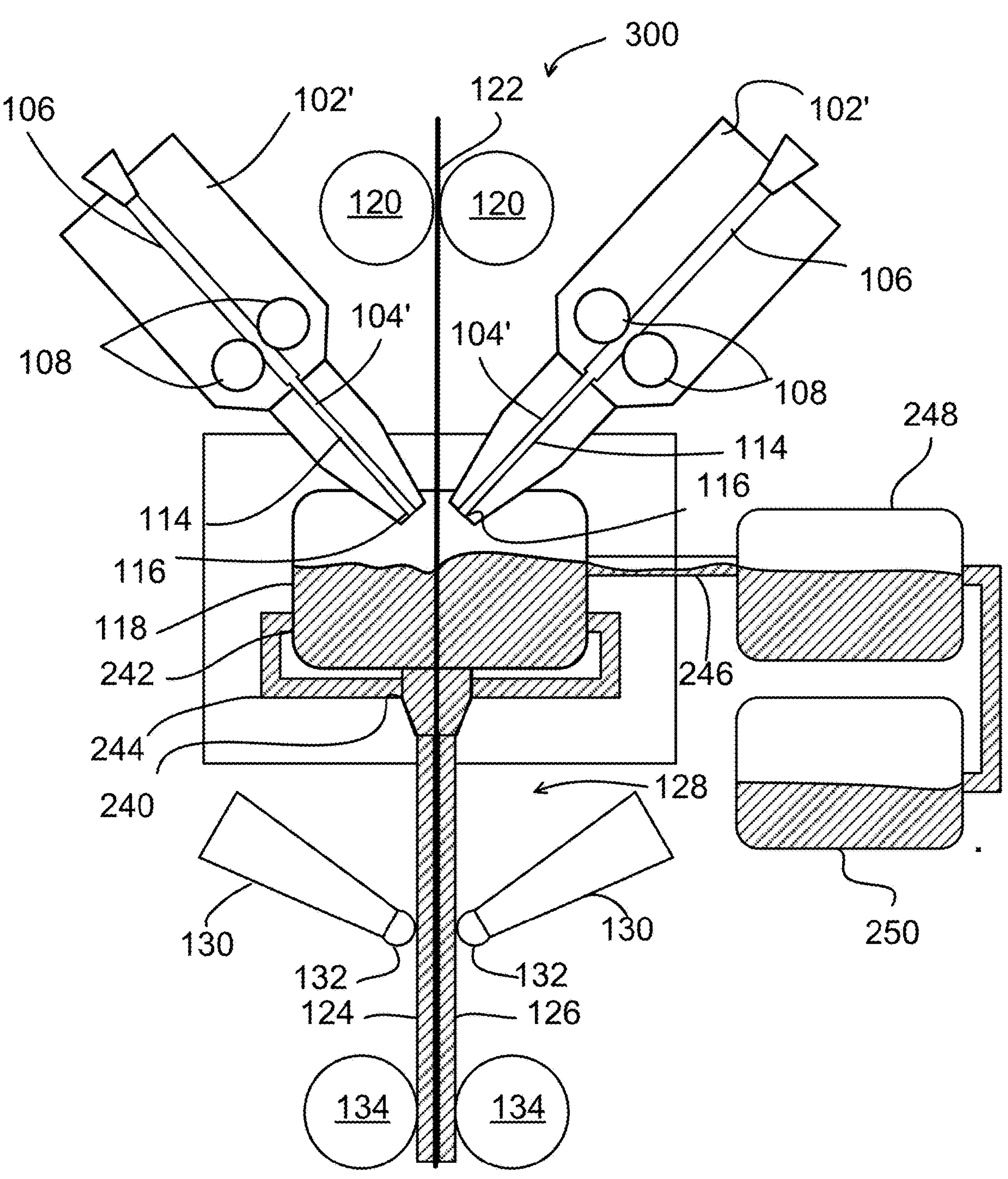
FIG. 4 is a schematic diagram of an apparatus for manufacturing an alkali metal coated current collector according to a fourth embodiment of this disclosure.

An apparatus for manufacturing an alkali metal coated current collector according to a fourth embodiment of this disclosure, is indicated generally as 300 in FIG. 4. The apparatus 300 is similar to the apparatus 200, and corresponding parts are identified with corresponding reference numerals. The apparatus 300 can comprise one or more extruders 102', each having a melt chamber 104' in the form of a passageway inside the extruder. There can be an inlet 106 extending to the melt chamber 104'. There can be at least one feed roller 108 in the inlet 106 for feeding alkali metal introduced into the inlet to the melt chamber. The inlet 106 and feed rollers 108 can feed alkali metal in the form of plates or coupons, or rolled stock. The extruders 102' can include a heater, such as an induction heater for melting alkali metal in the melt chamber 104'.

The speed of operation of the rollers 108 and the operation of the heater can be coordinated to so that the alkali metal is delivered at the correct temperature and quantity for coating the current collector substrate. In addition the heater may include a thermostatic control.

There is an outlet 114 extending from the melt chamber 104' to deliver to melted alkali metal to a dispensing opening 116 to a dispensing chamber 118. The dispensing chamber 118 may also have a heater, such as an induction heater, optionally thermostatically controlled, to maintain the temperature of the melted alkali metal in a suitable temperature range for application to current collector substrate. Temperatures sensors can be provided at the dispensing opening 116 and in the dispensing chamber 118.

There can be an openings 240, 242 and passageways 244 at the bottom of the dispensing chamber 118 for recirculating the melted alkali metal to the dispensing chamber 118. There can be a conduit 246 opening in the dispensing chamber 118 for removing impurities floating on the melted alkali metal in the dispensing chamber. The impurities, such as metal oxides and foreign matter, can be collected in a series of receptacles 248, 250, with the impurities concentrating in the second receptacle 248.

At least one drive roller 120 drives a current collector substrate 122 vertically though the dispensing chamber 118, where alkali metal layers 124, 126 are applied to both faces of the current collector substrate. The apparatus 300 can include a temperature-controlled zone 128 to condition the coated substrate. After the temperature-controlled zone 128, optional post extrusion controlled wipers 130 with tips 132 can further condition the surface of the alkali metal on the current collector substrate. A pair of conditioning rollers 134 can further treat the surface, and help drive the substrate through the dispensing chamber.

Figure 5:
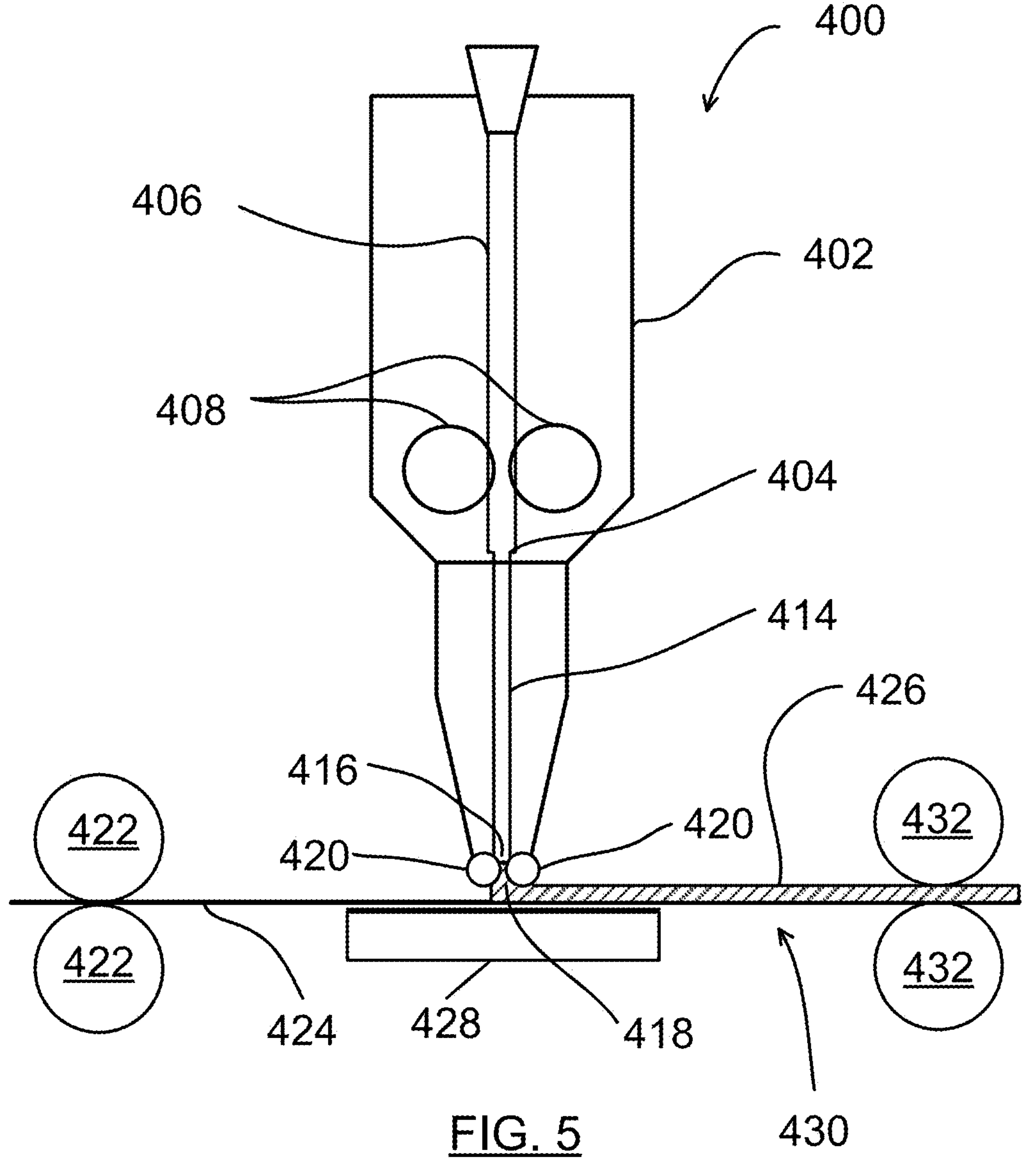
FIG. 5 is a schematic diagram of an apparatus for manufacturing an alkali metal coated current collector according to a fifth embodiment of this disclosure.
Figure 6:
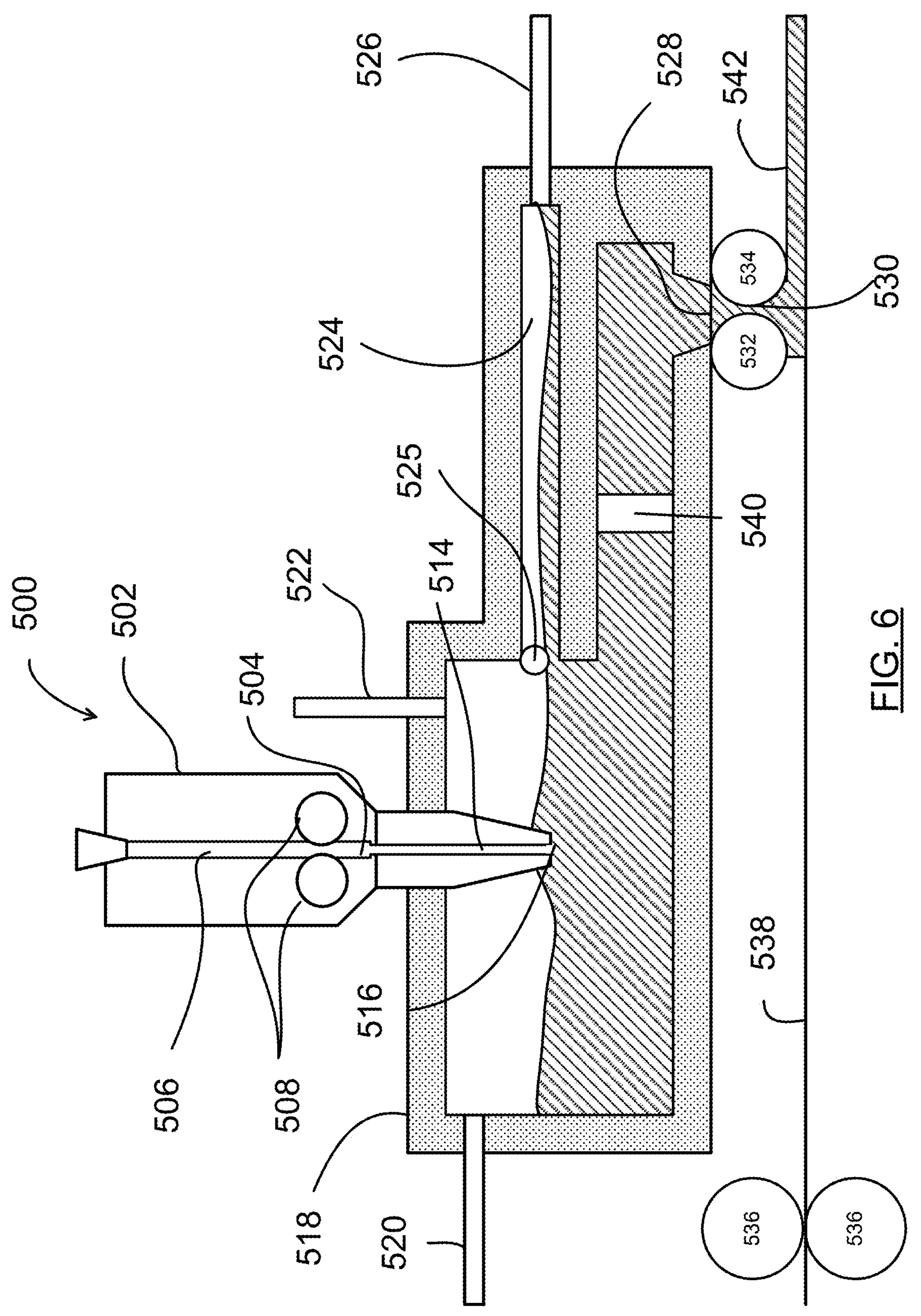
FIG. 6 is a schematic diagram of an apparatus for manufacturing an alkali metal coated current collector according to a sixth embodiment of this disclosure.

An apparatus for manufacturing an alkali metal coated current collector according to a fifth embodiment of this disclosure is indicated generally as 400 in FIG. 5. This apparatus 400 can comprise an extruder 402, having a melt chamber 404 in the form of a passageway. There can be an inlet 406 extending to the melt chamber 404. There can be at least one feed roller 408 in the inlet 106 for feeding alkali metal introduced into the inlet 406 to the melt chamber 404. The inlet 406 and feed rollers 408 can feed alkali metal in the form of plates or coupons, or rolled stock. The extruder 402 can include a heater, such as an induction heater for melting alkali metal in the melt chamber 404.

The speed of operation of the rollers 408 and the operation of the heater can be coordinated to so that the alkali metal is delivered at the correct temperature and quantity for coating the current collector substrate. In addition, the heater may include a thermostatic control.

There is an outlet 414 extending from the melt chamber 404 to deliver to melted alkali metal to a dispensing opening 416 to a dispensing chamber 418, formed between two rollers 420 adjacent the dispensing opening 416. Temperature sensors can be provided at the dispensing opening 116 and/or in the rollers 420.

At least one drive roller 422 drives a current collector substrate 424 past the dispensing chamber 418, where a layer alkali metal 426 is applied to the face of the current collector substrate 424. The opposite side of the current collector substrate can be supported on a stage 428, which can optionally be ultrasonically driven to distribute the metal applied to the current collector substrate 424. The apparatus can include a temperature-controlled zone 430 to condition the coated substrate. After the temperature-controlled zone, optional post extrusion controlled wipers (not shown) can further condition the surface of the alkali metal. A pair of conditioning rollers 432 can further treat the surface, and help drive the substrate 434 past the dispensing chamber 418.

An apparatus for manufacturing an alkali metal coated current collector according to a sixth embodiment of this disclosure, is indicated generally as 500 provided. This apparatus can comprise one or more extruders 502, each having a melt chamber 504 in the form of a passageway, and an inlet 506 extending to the melt chamber. There can be at least one feed roller 508 in the inlet 506 for feeding alkali metal introduced into the inlet 506 to the melt chamber 504. The inlet 506 and feed rollers 508 can feed alkali metal in the form of plates or coupons, or rolled stock. The feed rollers can be adjustable, such as by spring tension, magnetism, electromagnetism, or air pressure, to provide the appropriate contact force to the lithium, to ensure that the supply of material is not hindered or otherwise restricted. The extruder 502 can include a heater, such as an induction heater for melting alkali metal in the melt chamber 504.

The speed of operation of the rollers 508 and the operation of the heater can be coordinated to so that the alkali metal is delivered at the correct temperature and quantity for coating the current collector substrate. In addition, the heater may include a thermostatic control.

There is an outlet 514 extending from the melt chamber 504 to deliver to melted alkali metal through a dispensing opening 516 to a pressurized crucible 518. The crucible can allow gas entrained in the alkali metal to bubble out, to reduce porosity of the lithium delivered, and improve the surface quality of the lithium applied to the substrate. In other instances it may be desirable to bubble gas through the molten alkali metal to reduce its density and add porosity to the metal deposited on the substrate. The crucible 518 has a gas inlet 520 and a gas outlet 522 for the circulation of an inert gas (e.g. argon), to provide an inert, pressurized environment in the crucible.

The crucible 518 has a bypass 524 through which impurities floating on the surface of the melted alkali metal can be separated from the melted alkali metal. A wheel 525 can push floating impurities into the bypass 524. A port 526 allows the impurities to flow to one or more receptacles (not shown) like receptacles 248, 250, described above. The crucible 518 empties via an outlet 528 to a dispensing chamber 530 formed between dispensing rollers 532, 534. A plunger 540 can be provided to push melted alkali metal out of the crucible through outlet 528. A stage, like stage 428, can be provided to support the substrate 538 as the coating is alkali metal is dispensed.

At least one drive roller 536 drives a current collector substrate 538 past the dispensing chamber 530, where a layer alkali metal 542 is applied to a face of the current collector substrate. The apparatus can include a temperature controlled zone to condition the coated substrate. After the temperature controlled zone, optional post extrusion controlled wipers with tips can further condition the surface of the alkali metal. A pair of conditioning rollers can further treat the surface, and help drive the substrate past the dispensing chamber. All as shown and described above with respect to apparatus 400.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method of manufacturing an alkali metal coated current collector for a battery, the method comprising:
- melting the alkali metal in an inert atmosphere in an extruder, wherein the extruder has a nozzle that extends substantially across the width of a current collector substrate;
- removing impurities floating on the surface of the melted alkali metal; and
- applying the purified melted alkali metal to the surface of at least one side of a passing current collector substrate to form a coating from about 1 μm to about 100 μm thick on the current collector substrate.

2. The method of manufacturing an alkali metal coated current collector according to claim 1, wherein the step of applying the purified alkali metal to the passing current collector substrate comprises applying the purified alkali metal to both sides of the passing current collector substrate.

3. The method of manufacturing an alkali metal coated current collector according to claim 2, wherein the current collector substrate is moved vertically downwardly through a dispensing chamber containing the purified melted alkali metal.

4. The method of manufacturing an alkali metal coated current collector according to claim 1, wherein the current collector substrate is moved horizontally past a dispensing chamber containing the purified melted alkali metal.

5. The method of manufacturing an alkali metal coated current collector according to claim 1 further comprising passing the alkali metal coated current collector substrate past a conditioning wiper for conditioning the surface of the alkali metal coating.

6. The method of manufacturing an alkali metal coated current collector according to claim 1, wherein the alkali metal is melted in an extruder having a feed opening with at least one feed wheel for drawing in alkali metal into the extruder for melting.

7. The method of manufacturing an alkali metal coated current collector according to claim 1, wherein the extruder nozzle has an edge for conditioning the face of the alkali metal coating.

8. The method of manufacturing an alkali metal coated current collector according to claim 1, wherein floating impurities are removed by passing gas across the surface of the melted alkali metal to push the floating impurities out an outlet.

9. The method of manufacturing an alkali metal coated current collector according to claim 1, wherein floating impurities are removed by a rotating wheel that pushes the floating impurities out an outlet.

10. A method of manufacturing an alkali metal coated current collector for a battery, the method comprising:

melting the alkali metal;

removing impurities from the melted alkali metal;

applying the purified melted alkali metal from at least one pressurized extrusion head having a nozzle that extends substantially across the width of the current collector to the surface of at least one side of a passing current collector substrate to form a coating from about 1 μm to about 100 μm thick on the current collector substrate;

passing the coated current collector substrate through a temperature controlled zone to condition surface of the coated current collector; and passing the coated current collector substrate past a post extrusion control tip to further condition the surface.

* * * * *